United States Patent
Fujii et al.

(10) Patent No.: US 8,228,660 B2
(45) Date of Patent: Jul. 24, 2012

(54) CASE-MOLDED CAPACITOR AND METHOD FOR USING THE SAME

(75) Inventors: Hiroshi Fujii, Toyama (JP); Yukihiro Shimasaki, Hyogo (JP); Hiroki Takeoka, Nara (JP); Hiroshi Kubota, Toyama (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 12/520,956

(22) PCT Filed: Mar. 3, 2008

(86) PCT No.: PCT/JP2008/000417
§ 371 (c)(1),
(2), (4) Date: Jun. 23, 2009

(87) PCT Pub. No.: WO2008/108089
PCT Pub. Date: Sep. 12, 2008

(65) Prior Publication Data
US 2010/0039748 A1 Feb. 18, 2010

(30) Foreign Application Priority Data
Mar. 8, 2007 (JP) .................................. 2007-058042

(51) Int. Cl.
*H01G 2/14* (2006.01)
*H01G 5/017* (2006.01)
*H01G 2/00* (2006.01)
*H01G 4/06* (2006.01)

(52) U.S. Cl. ...................... 361/274.1; 361/311; 361/272

(58) Field of Classification Search ............... 361/274.3, 361/274.1, 311, 272
See application file for complete search history.

(56) References Cited

U.S. PATENT DOCUMENTS

| | | | |
|---|---|---|---|
| 5,060,114 A * | 10/1991 | Feinberg et al. | 361/706 |
| 6,021,040 A * | 2/2000 | Suzuki et al. | 361/514 |
| 6,885,538 B1 * | 4/2005 | Ishii et al. | 361/301.3 |
| 7,495,888 B2 * | 2/2009 | Take | 361/517 |
| 7,911,765 B2 * | 3/2011 | Takeoka et al. | 361/323 |
| 2006/0104006 A1 * | 5/2006 | Saito et al. | 361/301.3 |

FOREIGN PATENT DOCUMENTS

| | | |
|---|---|---|
| JP | 2006-196680 | 7/2006 |
| JP | 2006-253280 | 9/2006 |
| JP | 2007-019327 | 1/2007 |
| JP | 2007-042920 | 2/2007 |

OTHER PUBLICATIONS

Machine Translation of JP2006-253280A.*

* cited by examiner

*Primary Examiner* — Eric Thomas
*Assistant Examiner* — David M Sinclair
(74) *Attorney, Agent, or Firm* — McDermott Will & Emery LLP

(57) ABSTRACT

In a case-molded capacitor, an electrode of a capacitor element is connected with a busbar having an electrode terminal for external connection. The capacitor element and the busbar are placed in a metal case having an upper surface opening and are resin molded. A thermally-conductive insulator layer is provided between the capacitor element and a bottom surface of the metal case, hence providing the case-molded capacitor with a heat resistance.

9 Claims, 5 Drawing Sheets

CASE-MOLDED CAPACITOR AND METHOD FOR USING THE SAME

RELATED APPLICATIONS

This application is the U.S. National Phase under 35 U.S.C. §371 of International Application No. PCT/JP2008/000417, filed on Mar. 3, 2008, which in turn claims the benefit of Japanese Application No. 2007-058042, filed on Mar. 8, 2007, the disclosures of which Applications are incorporated by reference herein.

TECHNICAL FIELD

This invention relates to a case-molded capacitor including a capacitor element molded in a case with resin, particularly to a case-molded capacitor used for a smoothing capacitor in an inverter circuit for driving a vehicle motor.

BACKGROUND ART

Metallized film capacitors for use in inverters have been recently developed to have a small size, high performance, and low cost. The metallized film capacitors used in the inverters are required to withstand high working voltages, large electric currents, and to have large capacitances. To meet these requirements, a case-molded metallized film capacitor including plural capacitor elements which are connected in parallel to each other and which are molded in a case is put into a practical use. Such case-molded metallized film capacitor is required to have a large mechanical strength, a large thermal resistance, a high water resistance, and oil resistance.

FIG. 9 is a front sectional view of a conventional case-molded capacitor. As shown in FIG. 9, capacitor element 101 is provided by winding a metallized film having evaporated metal electrodes provided on one surface or both surfaces of the metalized film, such that the evaporated metal electrodes face each other across a dielectric film. Sprayed-metal electrodes 103 are provided on both ends of the capacitor element, or sprayed metal coating are provided on the electrodes of both ends of each capacitor element. Plural capacitor elements 101 are arranged to be attached to each other. Busbars 102 made of copper plates are electrode terminals for external connection attached to both ends of capacitor element 101. Busbars 102 are connected to sprayed-metal electrodes 103 formed on both ends of each of capacitor elements 101. Respective ends of the busbars extend upward and are exposed from metal case 104. Metal case 104 having capacitor elements 101 placed therein is made of aluminum. Insulating sheet 105 made of, e.g. polypropylene film having a thickness of 200 µm is placed inside metal case 104 so as to prevent metal case 104 and capacitor elements 101 from short-circuiting and to prevent metal case 104 and busbars 102 connected to the capacitor elements from short-circuiting. Mold resin 106 fills metal case 104 to mold, insulate, and fix the capacitor elements 101 connected via busbars 102 in case 104 except for a portion of electrode terminal 102a.

Patent document 1 is known as a prior art document related to the present invention.

This conventional case-molded capacitor may cause heat to remain in capacitor elements 101 depending on property of material of mold resin 106 when it is used with a large ripple current or at a high temperature to require heat dissipation of capacitor element 101. The heat remaining in capacitor elements 101 decreases virtual breakdown voltage (BDV) of capacitor element 101, thus deteriorating electrical characteristics of the capacitor.

Patent Document 1: JP2006-253280A

SUMMARY OF THE INVENTION

In a case-molded capacitor, an electrode of a capacitor element is connected with a busbar having an electrode terminal for external connection. The capacitor element and the busbar are placed in a metal case and resin-molded except for at least the electrode terminal of the busbar. A thermally-conductive insulator layer is provided between the metal case and the capacitor element underneath a mold resin. This case-mold capacitor has a humidity resistance due to the metal case made mainly of aluminum. The thermally-conductive insulator layer provided between the metal case and the capacitor element dissipates heat generated in the capacitor element through the thermally-conductive insulator layer to the metal case. This prevents a virtual BDV of the capacitor element from lowering, and prevents electrical characteristics of the capacitor from deteriorating.

Figure 1:
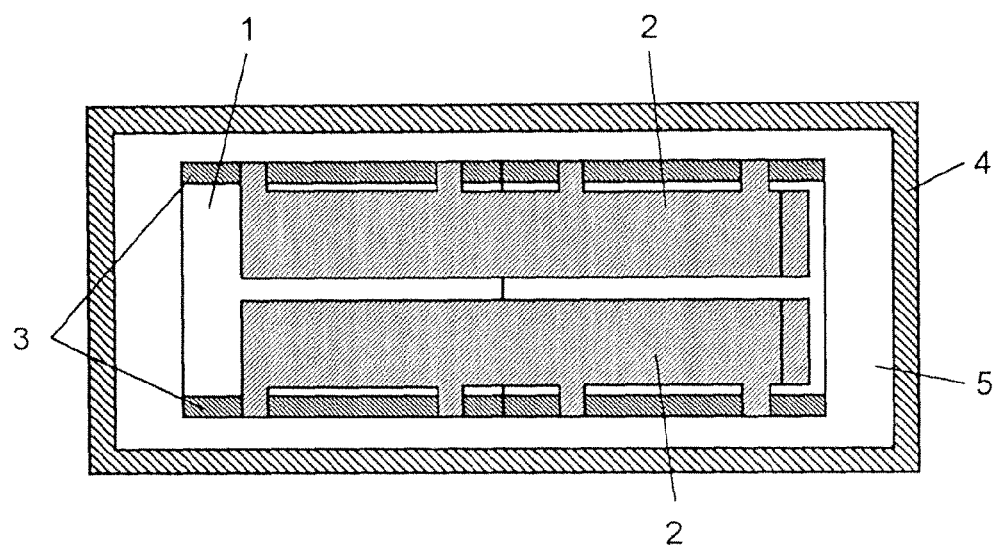
FIG. 1 is a top view of a case-molded capacitor in accordance with Exemplary Embodiment 1 of the present invention.

| REFERENCE NUMERALS | |
|---|---|
| 1 | Capacitor Element |
| 2, 2b, 2c, 2r, 2s | Busbar |
| 2a, 2d, 2e, 2p, 2q | Electrode Terminal |
| 2f, 2g | Connection Terminal |
| 3 | Sprayed-Metal Electrode |
| 4 | Metal Case |
| 5 | Mold Resin |
| 6 | Thermally-Conductive Insulator Layer |
| 7 | Cooling Unit |

DETAILED DESCRIPTION OF PREFERRED EMBODIMENTS

Exemplary Embodiment 1

Figure 2:
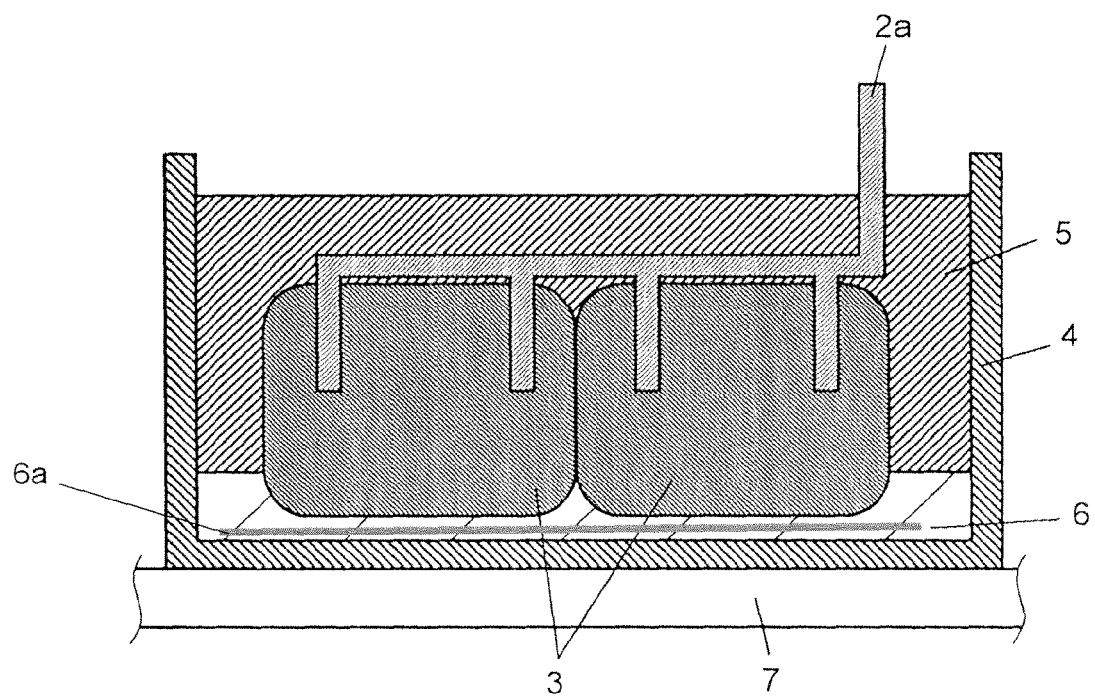
FIG. 2 is a front sectional view of the case-molded capacitor in accordance with Embodiment 1.

FIG. 1 is a top view of a case-molded capacitor in accordance with Exemplary Embodiment 1 of the present invention. FIG. 2 is a front sectional view of the capacitor. As shown in FIGS. 1 and 2, capacitor element 1 is formed by winding a metallized dielectric film having a metallized electrode on one surface or both surfaces of the film such that pair of the metallized electrodes face each other via a dielectric film, and electrodes are formed on both ends of the capacitor element. Busbar 2 made of copper plate includes electrode terminal 2a for external connection provided at an end of busbar 2. Busbar 2 is connected to each sprayed-metal electrode 3 formed on each of both ends of each of capacitor elements 1. Capacitor elements 1 are arranged side by side to be attached to each other. Electrode terminal 2a extends to above capacitor element 1 and is exposed from metal case 4. Metal case 4 is mainly made of aluminum, and has an upper surface opening. According to this embodiment, sprayed-metal electrode 3 formed on each of both ends of capacitor element 1 extends perpendicularly to a bottom surface of metal case 4.

Mold resin 5 mainly made of epoxy resin molds capacitor elements 1 and busbars 2 in metal case 4 except for electrode terminals 2a. Thermally-conductive insulator layer 6 is provided beneath mold resin 5 and between capacitor element 1 and the bottom surface of metal case 4. Thermally-conductive insulator layer 6 is mainly made of, e.g. epoxy resin, and filler, such as alumina, added therein. Thermally-conductive layer 6 electrically insulates among metal case 4, sprayed-metal electrodes 3, and capacitor elements 1, and allows heat to transmit to metal case 4. Cooling unit 7 attached onto a lower surface of metal case 4 has a large heat dissipation capability produced by cooling water running inside the unit or by its shape having, e.g. cooling fin shape. Cooling unit 7 is not generally a part of the capacitor, but can function as the bottom of metal case 4. It is determined whether or not cooling unit 7 is attached depending on necessity. The cooling unit is not illustrated in FIG. 1.

The case-molded capacitor according to the embodiment has a feature thermally-conductive insulator layer 6 provided between capacitor elements 1 and the bottom surface of metal case 4. This structure electrically insulates among capacitor elements 1 and conductive metal case 4, and diffuses heat generated in capacitor elements 1 through thermally-conductive insulator layer 6 into metal case 4 which has higher heat conductivity than mold resin 5 so as to remove the heat. Thus, capacitor element 1 is prevented from having electrical characteristics deteriorating due to heat remaining in capacitor element 1.

A breakdown voltage (BDV), an electrical characteristic of capacitor element 1 lowers virtually as the temperature of capacitor element 1 and ambient temperature become high, thereby causing an insulation breakdown of the capacitor below a desired voltage. Thus, high temperatures of the capacitor have conventionally deteriorated its electrical characteristics. However, according to the embodiment, heat from capacitor element 1 is dissipated and diffused so as to prevent the temperature of capacitor element 1 from rising, thus preventing electrical characteristics of the capacitor from deteriorating.

In the case that capacitor element 1 is formed by winding or stacking a metallized film made of polypropylene film, a grounding area of the capacitor element 1 can be increased by placing sprayed-metal electrodes 3 of the element perpendicular to the bottom surface of metal case 4, that is, by placing an outer periphery (or side edges) of the element on the bottom surface of the case. This arrangement enhances effects to radiate heat from capacitor element 1.

Thermally-conductive insulator layer 6, upon contacting capacitor elements 1 and busbars 2, further enhances the heat radiation effects.

The thermal conductivity of thermally-conductive insulator layer 6 can be higher than that of mold resin 5 but lower than that metal case 4. This arrangement provides a gradual change of the thermal conductivities from capacitor element 1, thereby diffusing the heat efficiently in a large area.

The thermal conductivity of thermally-conductive insulator layer 6 not lower than 3 W/mK diffused the heat more efficiently. The thermal conductivity lower than 3 W/mK may cause the heat to remain in capacitor element 1.

In order to enhance the thermal conductivity of thermally-conductive insulator layer 6, the layer may preferably contain at least 55 vol. % of alumina filler added to the resin. The filler may have a spherical shape so as to be contained in the layer more, accordingly increases the heat conductivity in proportion to the amount of the filler.

Thermally-conductive insulator layer 6 preferably contains at least one resin selected from the groups consisting of epoxy resin, phenol resin, and urethane resin, and at least one inorganic filler selected from the group consisting of alumina, magnesium oxide, boron oxide, silicon oxide, silicon carbide, silicon nitride, and aluminum nitride.

Thermally-conductive insulator layer 6 preferably has an insulation withstand voltage not lower than 3 kV/mm and an insulation resistance not smaller than 1000 MΩ/cm. An insulating spacer 6a may be embedded in thermally-conductive insulator layer 6 so as to increase its insulation property. The spacer may preferably be made of, e.g. glass beads or resin. The thermal conductivity of the spacer is preferably similar to or higher than that of thermally-conductive insulator layer 6.

In the manufacturing process of the capacitor, mold resin 5 is injected after capacitor element 1 is placed on the thermally-conductive insulator layer 6 while the layer 6 is hardened. If the injection is executed before layer 6 is sufficiently hardened, capacitor element 1 may touch the bottom surface of metal case 4. The spacer embedded in the layer provides the electrical insulation property even when thermally-conductive insulator layer 6 is in hardening process.

According to this embodiment, the material of thermally-conductive insulator layer 6 has a viscosity ranging from 500 Pa·s to 2000 Pa·s at a heating temperature ranging from 60 to 120° C. when thermally-conductive insulator layer 6 is manufactured. This viscosity allows thermally-conductive insulator layer 6 to be manufactured easily. This viscosity is higher than that of epoxy resin and urethane resin, material of mold resin 5.

It is difficult to have thermally-conductive insulator layer 6 fill entirely metal case 4 due to its work efficiency, for removing void during the filling process and for weight reduction requirement. Therefore, thermally-conductive insulator layer 6 can cover at least the bottom surface of metal case 4.

According to this embodiment, thermally-conductive insulator layer 6 has a linear thermal expansion coefficient of 25 ppm/° C. The linear thermal expansion coefficient of thermally-conductive insulator layer 6 changes according to the filler, and is preferably close to that of metal case 4.

According to this embodiment, adhesive strength between thermally-conductive insulator layer 6 and metal case 4 is 3 MPa. The adhesive strength of thermally-conductive insulator layer 6 can be increased by the filler. Upon having the adhesive strength not smaller than 3 MPa with the filler, thermally-conductive insulator layer 6 is prevented from being removed from meal case 4 even when heat shock is applied.

Exemplary Embodiment 2

Figure 3:
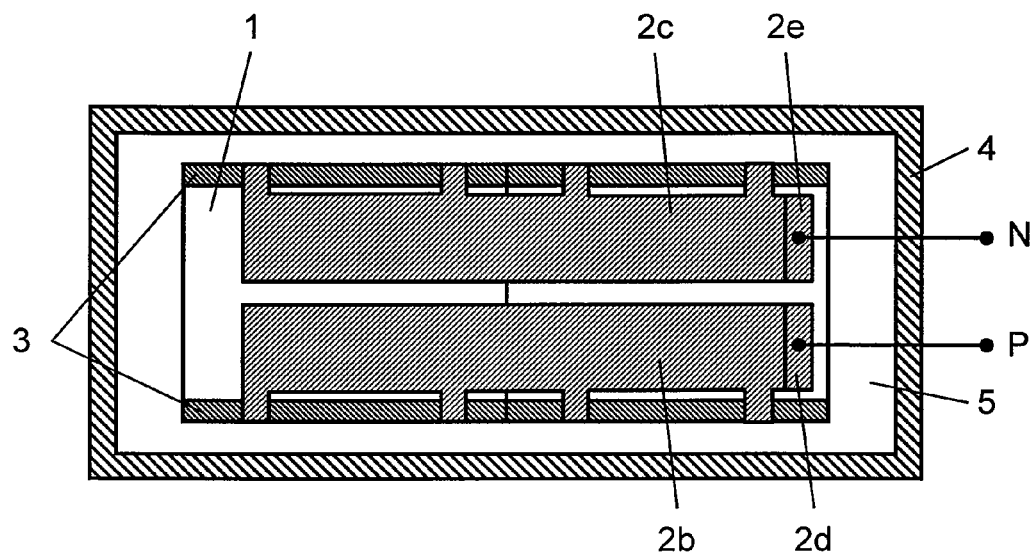
FIG. 3 is a top sectional view of a case-molded capacitor in accordance with Exemplary Embodiment 2 of the invention.
Figure 4:
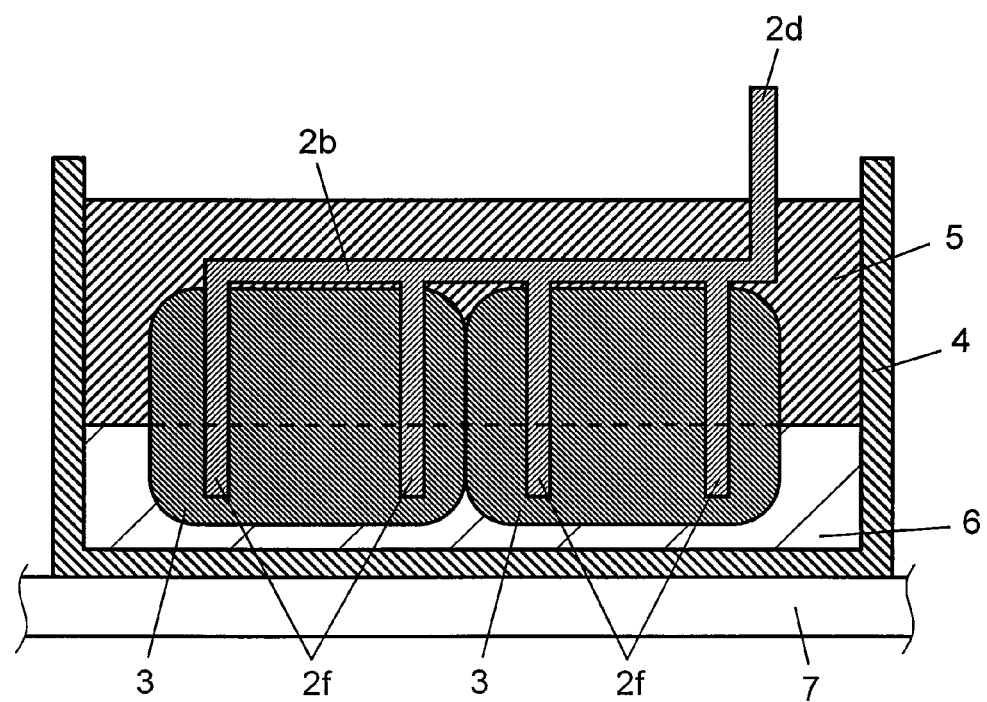
FIG. 4 is a front sectional view of the case-molded capacitor in accordance with Embodiment 2.
Figure 5:
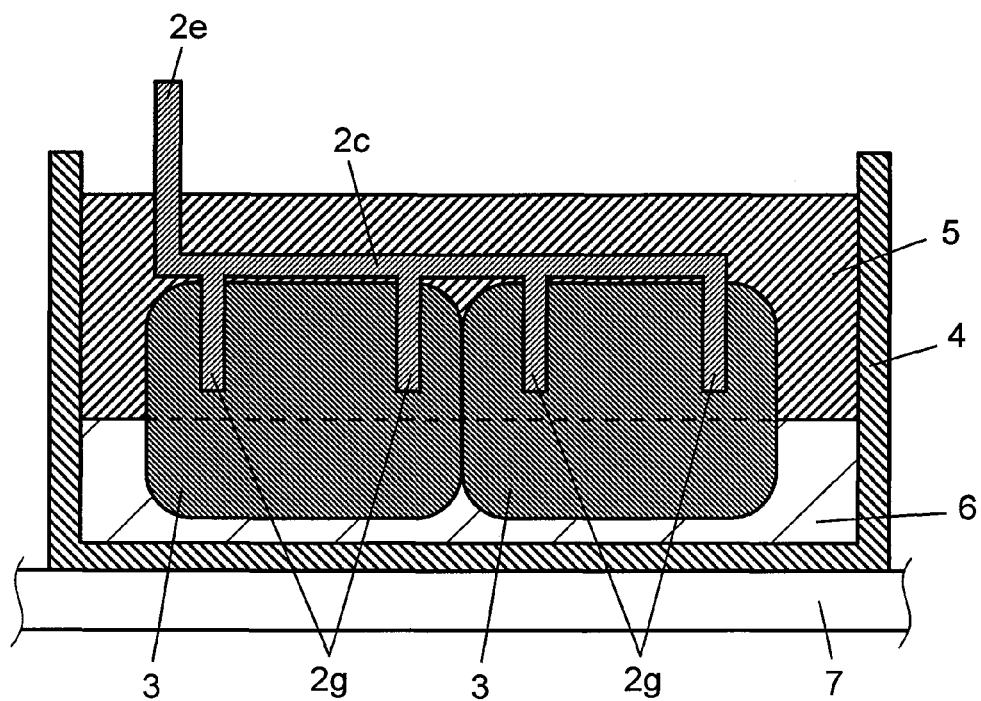
FIG. 5 is a rear sectional view of the case-molded capacitor in accordance with Embodiment 2.

FIG. 3 is a top sectional view of a case-molded capacitor in accordance with Exemplary Embodiment 2 of the present invention. FIG. 4 is a front sectional view of the case-molded capacitor in accordance with Embodiment 2. FIG. 5 is a rear sectional view of the case-molded capacitor in accordance with Embodiment 2. In there figures, components identical to those of the capacitor according to Embodiment 1 will be denoted by the same reference numerals.

The capacitor according to this embodiment is different from the capacitor according to Embodiment 1 in busbars 2b and 2c. As shown in FIG. 4, busbar 2b has longer connection terminal 2f contacting sprayed-metal electrode 3. Connection terminal 2f also contacts thermally-conductive insulator layer 6. On the other hand, as shown in FIG. 5, shorter connection terminal 2g opposite to terminal 2f contacts sprayed-metal electrode 3. Connection terminal 2g does not contact thermally-conductive insulator layer 6.

Upon this capacitor having heat when a temperature rises, the heat is easily dissipated to a busbar 2b since connection terminal 2f contacts thermally-conductive layer insulator 6 for cooling off the capacitor. On the other hand, the heat is not easily dissipated at busbar 2c since connection terminal 2g does not contact thermally-conductive insulator layer 6. Electrode terminal 2d of busbar 2b of the capacitor is connected to a positive electrode of an external power supply, and electrode terminal 2e of busbar 2c is connected to a negative electrode of the power supply. A voltage at the positive electrode of the external power supply is higher than a voltage of the negative electrode. It is experimentally known that, in an inverter power supply for vehicles, the positive electrode generates more heat, which is called "passive heat", than the negative electrode does. According to this embodiment, the heat at the positive is easily dissipated so as to allow the "passive heat" to be adequately diffused for cooling. This arrangement balances heat distributed in the capacitor, thereby preventing electrical characteristics of the capacitor from deteriorating.

Exemplary Embodiment 3

Figure 6:
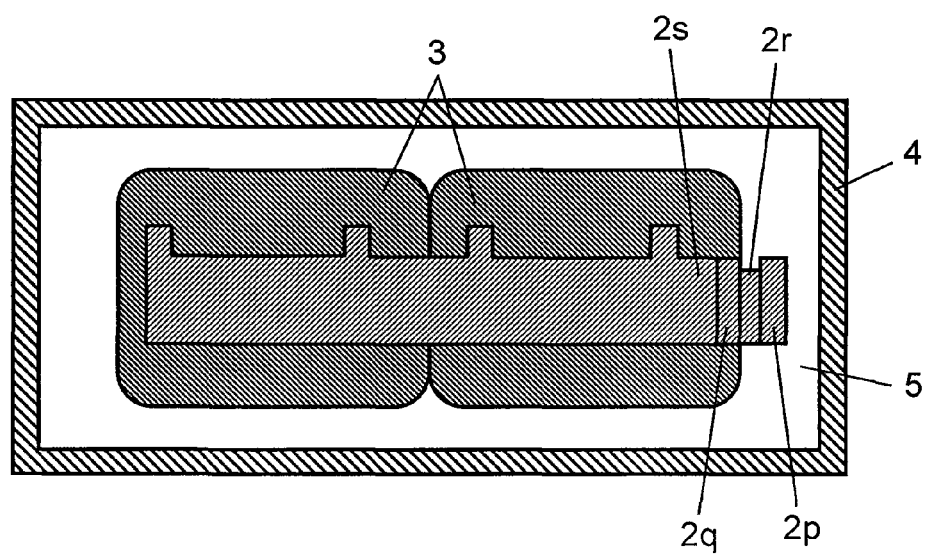
FIG. 6 is a top view of a case-molded capacitor in accordance with Exemplary Embodiment 3 of the invention.
Figure 7:
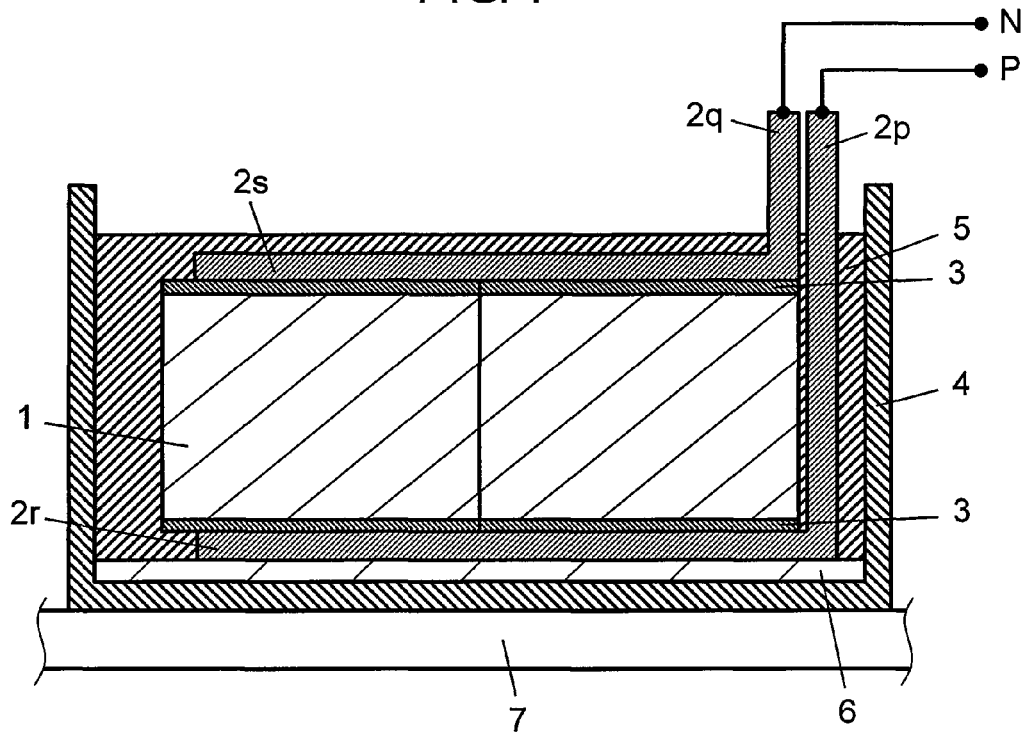
FIG. 7 is a front sectional view of the case-molded capacitor in accordance with Embodiment 3.

FIG. 6 is a top view of a case-molded capacitor in accordance with Exemplary Embodiment 3 of the invention. FIG. 7 is a front sectional view of the case-molded capacitor in accordance with Embodiment 3. The capacitor according to this embodiment is almost the same as the capacitor according to Embodiment 1 except for that the arrangement of capacitor element 1 and busbar 2 is partially different from that of the capacitor according to Embodiment 1. In these Figures, components identical to those shown in FIGS. 1 and 2 are denoted by the same reference numerals, and their detail description will be omitted. Only the difference will be explained with reference to the figures.

According to this embodiment, the orientation of capacitor element 1 is different by 90 degrees. The capacitor element according to the Embodiment 1 is called a lateral arrangement, while the capacitor element according to this embodiment is called as "a vertical arrangement". That is, one of sprayed-metal electrodes 3 faces a bottom surface of the case while the other of sprayed-metal electrodes 3 faces the upper surface of the case. In other words, sprayed-metal electrodes 3 are arranged in parallel to the bottom surface of the case. Busbar 2r is connected to sprayed-metal electrode 3 facing the bottom surface. Busbar 2s is connected to sprayed-metal electrode 3 facing the upper surface of the case. Electrode terminal 2p of busbar 2r and electrode terminal 2q of busbar 2s extend through the upper surface of the capacitor. Thermally-conductive insulator layer 6 is provided between capacitor element 1 and the bottom surface of metal case 4 and between busbar 2r and the bottom surface of metal case 4.

This arrangement allows heat generated by a ripple current to transmit to busbar 2 and sprayed-metal 3. Sprayed-metal electrodes 3 of capacitor element 1 are arranged in parallel to the bottom surface of metal case 4, in particular, busbar 2r and sprayed-metal 3 are arranged approximating to the bottom surface, hence facilitating to dissipate the heat through busbar 2r and sprayed-metal 3 more effectively.

According to this embodiment, electrode terminal 2p is connected to the positive electrode of the power supply, and electrode terminal 2q is connected to the negative electrode of the power supply. The bar connected to the positive electrode which generates heat more than the negative electrode contacts thermally-conductive insulator layer 6 so as to facilitate diffusing the heat, thereby preventing a temperature rising of the capacitor element and preventing electrical characteristics from deteriorating.

Exemplary Embodiment 4

Figure 8:
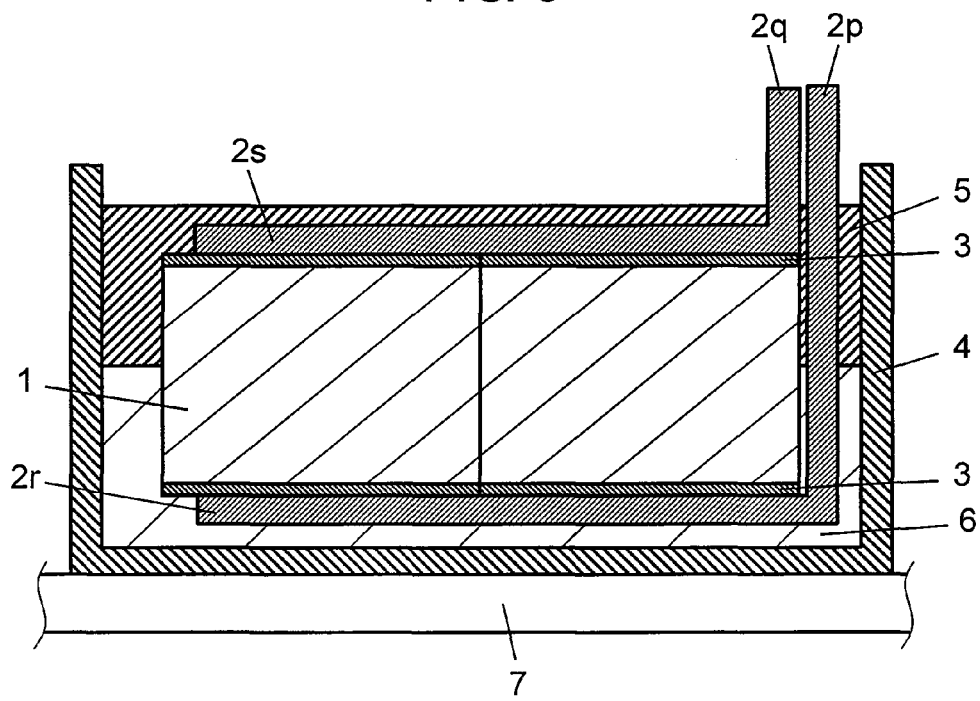
FIG. 8 is a front sectional view of a case-molded capacitor in accordance with Exemplary Embodiment 4 of the invention.

FIG. 8 is a front sectional view of a case-molded capacitor in accordance with Exemplary Embodiment 4 of the invention. As shown in FIG. 8, thermally-conductive insulator layer 6 covers a portion of an outer surface or a side surface of capacitor element 1 so as to dissipate heat more. This structure dissipates heat from busbars 2 and sprayed-metal electrodes 3 as well as heat inside capacitor element 1 through thermally-conductive insulator layer 6, accordingly preventing deterioration of electrical characteristics.

Characteristics of the case-molded capacitors according to the embodiments were measured in order to confirm effects of the case-molded capacitors to dissipating heat. The results will be described below. In all the following Examples, mold resin 5 was made of epoxy resin and silica particles added to the resin, and had a thermal conductivity of 0.6 W/mK.

Example 1

In Example 1 of the case-molded capacitor according to Embodiment 1, thermally-conductive insulator layer 6 according to Embodiment 1 was made of epoxy resin and alumina particles added to the resin. The thermal conductivity of layer 6 was 3 W/mK. Example 1 of the capacitor was measured in a temperature rise from an ambient temperature at surfaces of capacitor element 1 and mold resin 5.

Example 2

In Example 2 of the case-molded capacitor according to Embodiment 2, thermally-conductive insulator layer 6 was made of epoxy resin and alumina particles added to the resin. The thermal conductivity of layer 6 was 3 W/mK. Example 3 of the capacitor was measured in a temperature rise from an ambient temperature at surfaces of capacitor element 1 and mold resin 5.

Example 3

In Example 3 of the case-molded capacitor according to Embodiment 1, thermally-conductive insulator layer 6 was made of epoxy resin and boron nitride particles added to the resin. The thermal conductivity of layer 6 was 7 W/mK. Example 3 of the capacitor was measured in a temperature rise from an ambient temperature at surfaces of capacitor element 1 and mold resin 5.

Comparative Example

Figure 9:
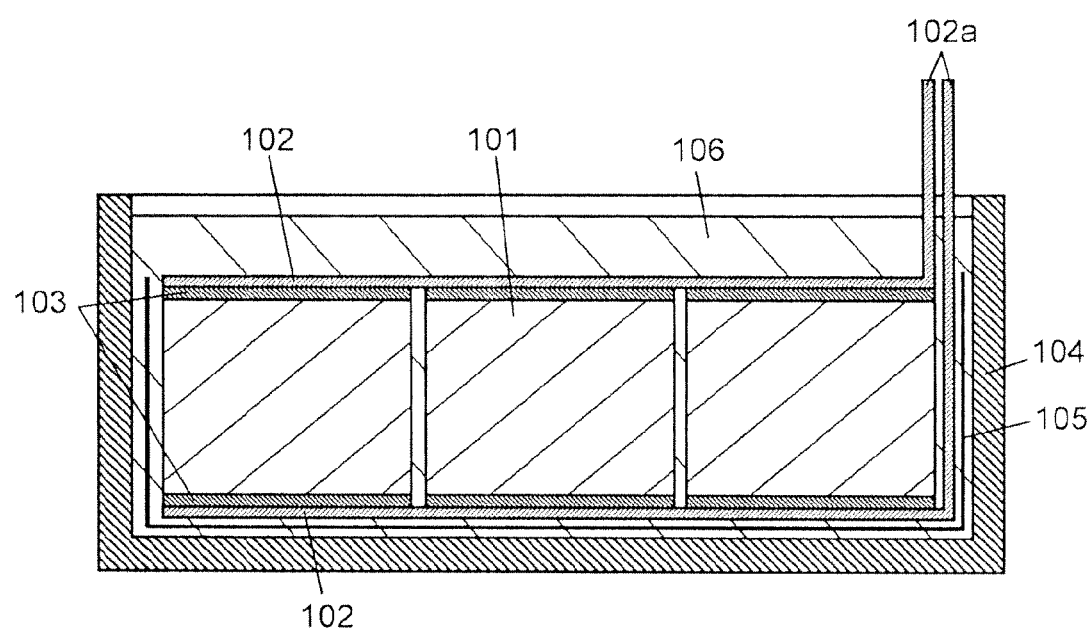
FIG. 9 is a front sectional view of a conventional case-molded capacitor.

Comparative Example of the conventional case-molded capacitor shown in FIG. 9 included mold resin 106 and did not include thermally-conductive insulator layer 6. Mold resin 106 was made of epoxy resin and silica particles added to the rein, and had a thermal conductivity of 0.6 W/mK. Comparative Example of the capacitor was measured in a temperature rise from an ambient temperature at surfaces of capacitor element 101 and mold resin 106.

The measurements are shown in Table 1.

TABLE 1

|  | Temperature at Capacitor Element | Temperature at Surface of Mold Resin |
| --- | --- | --- |
| Example 1 | +7.0° C. | +6.0° C. |
| Example 2 | +6.8° C. | +5.7° C. |
| Example 3 | +5.0° C. | +4.5° C. |
| Comparative Example | +10.0° C. | +7.5° C. |

As shown in Table 1, each of Examples 1 to 3 of the capacitor has a smaller temperature rise at the element and at the surface of the mold resin than Comparative Example of the capacitor. This measurements show that Capacitor element 1 of Examples 1 to 3 prevents heat from remaining, and facilitates dissipating the heat through thermally-conductive insulator layer 6 to metal case 4 and diffusing the heat to remove the heat.

According to the above embodiments, the capacitor includes a pair of busbars, or two busbars, but number of the busbars is not limited to two.

INDUSTRIAL APPLICABILITY

A case-molded capacitor according to the invention has electrical characteristics from deteriorating even when it is used at high temperatures. Thus, the capacitor is useful particularly for vehicles where high reliability is required.

The invention claimed is:

1. A case-molded capacitor comprising:
   a capacitor element including a first electrode and a second electrode, the first electrode being provided at one end of the capacitor element, the second electrode being provided at another end of the capacitor element;
   a first busbar including a first connection terminal and a first electrode terminal for external connection, the first connection terminal being joined directly to the first electrode of the capacitor element;
   a second busbar including a second connection terminal and a second electrode terminal for external connection, the second connection terminal being joined directly to the second electrode of the capacitor element;
   a case having an upper surface opening and made of metal, the case accommodating the capacitor element, the first busbar, and the second busbar therein;
   a mold resin filling the case to cover the capacitor element, the first busbar, and the second busbar except for the first electrode terminal and the second electrode terminal exposed from the mold resin; and
   a thermally-conductive insulator layer provided between the capacitor element and a bottom surface of the case and between the mold resin and the bottom surface of the case, the thermally-conductive insulator having a higher thermally-conductivity than the mold resin, wherein:
   the first and second electrodes extend perpendicularly with respect to the bottom surface of the case,
   the first and second connection terminals extend toward the bottom surface of the case and perpendicularly with respect to the bottom surface of the case,
   the first connection terminal is longer than the second connection terminal,
   the first connection terminal contacts the thermally-conductive insulator layer, and
   the second connection terminal does not contact the thermally-conductive insulator layer.

2. The case-molded capacitor according to claim 1, wherein:
   the capacitor element further includes a metallized film being wound or stacked,
   the first electrode is provided on one end of the metalized film, and
   the second electrode is provided on another end of the metalized film.

3. The case-molded capacitor according to claim 1, wherein:
   the thermal conductivity of the thermally-conductive insulator layer is lower than a thermal conductivity of the case, and
   the thermal conductivity of the thermally-conductive insulator layer is not smaller than 3 W/mK.

4. The case-molded capacitor according to claim 1, further comprising an insulating spacer embedded in the thermally-conductive insulator layer.

5. The case-molded capacitor according to claim 1, wherein:
   the first electrode terminal of the first busbar is arranged to be connected to a positive electrode of a power supply, and
   the second electrode terminal of the second busbar is arranged to be connected to a negative electrode of the power supply.

6. A method of using a case-molded capacitor, comprising providing the case-molded capacitor according to claim 1; connecting the first electrode terminal of the first busbar with a positive electrode of a power supply; and connecting the second electrode terminal of the second busbar with a negative electrode of the power supply.

7. The case-molded capacitor according to claim 1, wherein the first electrode is a sprayed-metal electrode.

8. The case-molded capacitor according to claim 1, wherein the second electrode is a sprayed-metal electrode.

9. The case-molded capacitor according to claim 1, wherein at least a part of a portion of the first connection terminal directly joined to the connection terminal contacts the thermally-conductive insulator layer.

* * * * *